US012749696B2

(12) United States Patent
Baek et al.

(10) Patent No.: US 12,749,696 B2
(45) Date of Patent: Sep. 29, 2026

(54) SYSTEM FOR REGULATING PRESSURE IN LIQUID HYDROGEN FUEL TANK FOR A FUEL CELL ELECTRIC VEHICLE

(71) Applicant: KOREA AEROSPACE RESEARCH INSTITUTE, Daejeon (KR)

(72) Inventors: Seungwhan Baek, Daejeon (KR); Young Suk Jung, Daejeon (KR); Kwang Kun Park, Daejeon (KR); I Sang Yu, Daejeon (KR); Kie Joo Cho, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 483 days.

(21) Appl. No.: 18/498,780

(22) Filed: Oct. 31, 2023

(65) Prior Publication Data

US 2024/0178420 A1 May 30, 2024

(30) Foreign Application Priority Data

Nov. 29, 2022 (KR) ........................ 10-2022-0162382

(51) Int. Cl.
*H01M 8/04746* (2016.01)
*H01M 8/04089* (2016.01)

(52) U.S. Cl.
CPC ... *H01M 8/04753* (2013.01); *H01M 8/04104* (2013.01); *H01M 2250/20* (2013.01)

(58) Field of Classification Search
CPC ......... H01M 8/04753; H01M 8/04104; H01M 2250/20
See application file for complete search history.

(56) References Cited

U.S. PATENT DOCUMENTS 3,389,555 A * 6/1968 Goldstein ................. F02K 7/08 62/47.1
2017/0291486 A1* 10/2017 Tanaka .............. H01M 8/04776
2024/0178420 A1* 5/2024 Baek ................. H01M 8/04201

FOREIGN PATENT DOCUMENTS

JP 2003-130290 A 5/2003
JP 2006-349133 A 12/2006
(Continued)

OTHER PUBLICATIONS

Machine Translation of JP-2003130290-A (Apr. 24, 2026) (Year: 2026).*
(Continued)

*Primary Examiner* — Matthew J Merkling
(74) *Attorney, Agent, or Firm* — Rabin & Berdo, P.C.

(57) ABSTRACT

Provided is a pressure control device for a liquid hydrogen tank for a hydrogen fuel cell vehicle that includes a fuel cell, a battery, and a drive motor, wherein the liquid hydrogen tank includes a vacuum chamber, an inner chamber inside the vacuum chamber and storing liquid hydrogen therein, and a multi-layered insulation surrounding the inner chamber. The pressure control device includes a liquid hydrogen pump inside a liquid hydrogen section, an expansion valve located downstream of the liquid hydrogen pump, a heat exchanger located downstream of the expansion valve, a first flow path through which liquid hydrogen supplied from the liquid hydrogen pump passes through the heat exchanger and is sprayed into a gaseous hydrogen section, and a second flow path through which the liquid hydrogen supplied from the liquid hydrogen pump sequentially passes through the expansion valve and the heat exchanger and flows.

4 Claims, 5 Drawing Sheets

(56) References Cited

FOREIGN PATENT DOCUMENTS

| | | | | | |
|---|---|---|---|---|---|
| JP | 2018-096435 | A | | 6/2018 | |
| JP | 2022-528829 | A | | 6/2022 | |
| KR | 10-2019-0060743 | A | | 6/2019 | |
| WO | WO-2020242899 | A1 | * | 12/2020 | ............... H02K 9/19 |

OTHER PUBLICATIONS

Hedayat, Analyzing the Use of Gaseous Helium as a Pressurant With Cryogenic Propellants With Thermodynamic Venting System Modelling and Test Data, AIP Conf. Proc. 985, 1491â1498 (2008) (Year: 2008).*

* cited by examiner

SYSTEM FOR REGULATING PRESSURE IN LIQUID HYDROGEN FUEL TANK FOR A FUEL CELL ELECTRIC VEHICLE

CROSS-REFERENCE TO RELATED APPLICATION

This application claims priority under 35 U.S.C. § 119 to Korean Patent Application No. 10-2022-0162382, filed in the Korean Intellectual Property Office on Nov. 29, 2022, the entire contents of which are hereby incorporated by reference.

BACKGROUND

Technical Field

The disclosure relates to a system for regulating pressure in liquid hydrogen fuel tank for a fuel cell electric vehicle.

Description of Related Art

The use of hydrogen energy is increasing as one of the ways to solve the problems of environmental pollution and global warming caused by the use of fossil fuels such as coal.

The hydrogen energy is an eco-friendly energy source, and unlike the conventional fossil energy, it only produces water and does not emit any greenhouse gases when converted to electricity and heat.

In order to use hydrogen as an energy source, a method of liquefying hydrogen and storing it in the form of liquid hydrogen for easy transport and storage is used. That is, the method of charging a liquid hydrogen storage tank with liquid hydrogen and then injecting it into hydrogen fuel cell vehicles, drones, etc. is used.

FIG. 1 shows an example of a related liquid hydrogen tank 500.

The related liquid hydrogen tank 500 includes, as the main components, a vacuum chamber 100, an inner chamber 200 located in the vacuum chamber 100, a multi-layered insulation (MLI) 300 surrounding the inner chamber 200, and a relief valve 400 for discharging gas.

However, in order to store hydrogen in a liquid state, the hydrogen must be maintained at a value close to 20 K (liquefaction point), but in the liquid hydrogen storage tank, the liquid hydrogen naturally evaporates as heat penetration from the outside occurs due to radiation, conduction, convection, and the like at room temperature. As a result, the pressure of the liquid hydrogen tank increases even when not in use, and when a predetermined limit pressure is reached, evaporation gas is released to the outside through a relief valve to prevent further increase in the pressure of the liquid hydrogen tank. Accordingly, there is a problem in which the stored liquid hydrogen is wasted unnecessarily.

Meanwhile, the hydrogen fuel cell vehicle, that is, the hydrogen electric vehicle is one of the eco-friendly vehicles, and it delivers pressurized hydrogen safely stored in a hydrogen fuel tank and oxygen brought in through the air supply system to the fuel cell stack, causing an electrochemical reaction to produce electrical energy. The produced electrical energy is converted into kinetic energy through the drive motor to move the hydrogen electric vehicle.

SUMMARY

In order to solve the problems of the related art described above, an object of the disclosure is to provide a pressure control device for a liquid hydrogen tank for a hydrogen fuel cell vehicle, which is capable of managing the temperature and pressure of the liquid hydrogen storage tank efficiently and stably.

Further, the objects of the disclosure are not limited to the above, and also include other objects that can solve the problems of the related art from the configuration of the disclosure described below.

In order to achieve the objects described above, a temperature-pressure control device for a liquid hydrogen tank for a hydrogen fuel cell vehicle that includes a fuel cell, a battery, and a drive motor is provided, in which the liquid hydrogen tank may include a vacuum chamber, an inner chamber located in the vacuum chamber and storing liquid hydrogen therein, and a multi-layered insulation (MLI) surrounding the inner chamber, and the pressure control device may include a liquid hydrogen pump located in a liquid hydrogen section of the inner chamber, an expansion valve located downstream of the liquid hydrogen pump, a heat exchanger located downstream of the expansion valve, a first flow path through which liquid hydrogen supplied from the liquid hydrogen pump passes through the heat exchanger and is sprayed into a gaseous hydrogen section of the inner chamber, and a second flow path through which the liquid hydrogen supplied from the liquid hydrogen pump sequentially passes through the expansion valve and the heat exchanger and flows.

In addition, the heat exchanger may be a co-current flow heat exchanger through which the first flow path and the second flow path pass.

In addition, the pressure control device may further include a turbine, an auxiliary generator driven by the turbine to supply electrical energy to the battery, and a third flow path that contacts and surrounds the multi-layered insulation and allows fluid flowing out of the turbine to flow toward the fuel cell, and the second flow path may be connected to the third flow path in such a way that the second flow path branches off from the third flow path.

In addition, a first check valve may be located in the second flow path, and a second check valve may be located in the third flow path, and the second check valve may be located downstream of a point where the second flow path branches off from the third flow path.

In addition, the pressure control device may further include an electric heater that heats the liquid hydrogen in the inner chamber, and a fourth flow path through which gaseous hydrogen is supplied to the turbine from the gaseous hydrogen section of the inner chamber.

The pressure control device for a liquid hydrogen tank according to some embodiments of the disclosure having the configuration described above has the following effects.

Even when the hydrogen electric vehicle is on standby, the pressure control device for the liquid hydrogen tank according to the embodiments can lower the pressure of the liquid hydrogen tank where the internal pressure increases and can also generate power and store it in a battery of the hydrogen electric vehicle.

Meanwhile, it goes without saying that although not explicitly stated, the present disclosure includes other effects that can be expected from the configuration described above.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Hereinafter, preferred embodiments of the present disclosure will be described in detail with reference to the accompanying drawings, which will be readily apparent to those skilled in the art to which the present disclosure pertains. However, the description proposed herein is just a preferable example for the purpose of illustrations only, not intended to limit the scope of the disclosure, so it should be understood that other equivalents and modifications could be made thereto without departing from the scope of the disclosure.

Figure 1:
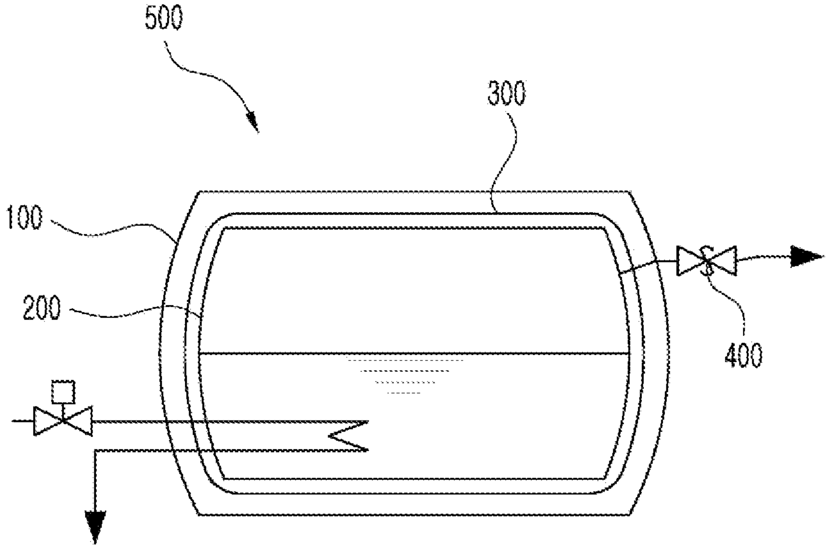
FIG. 1 shows an example of a related liquid hydrogen storage tank.
Figure 2:
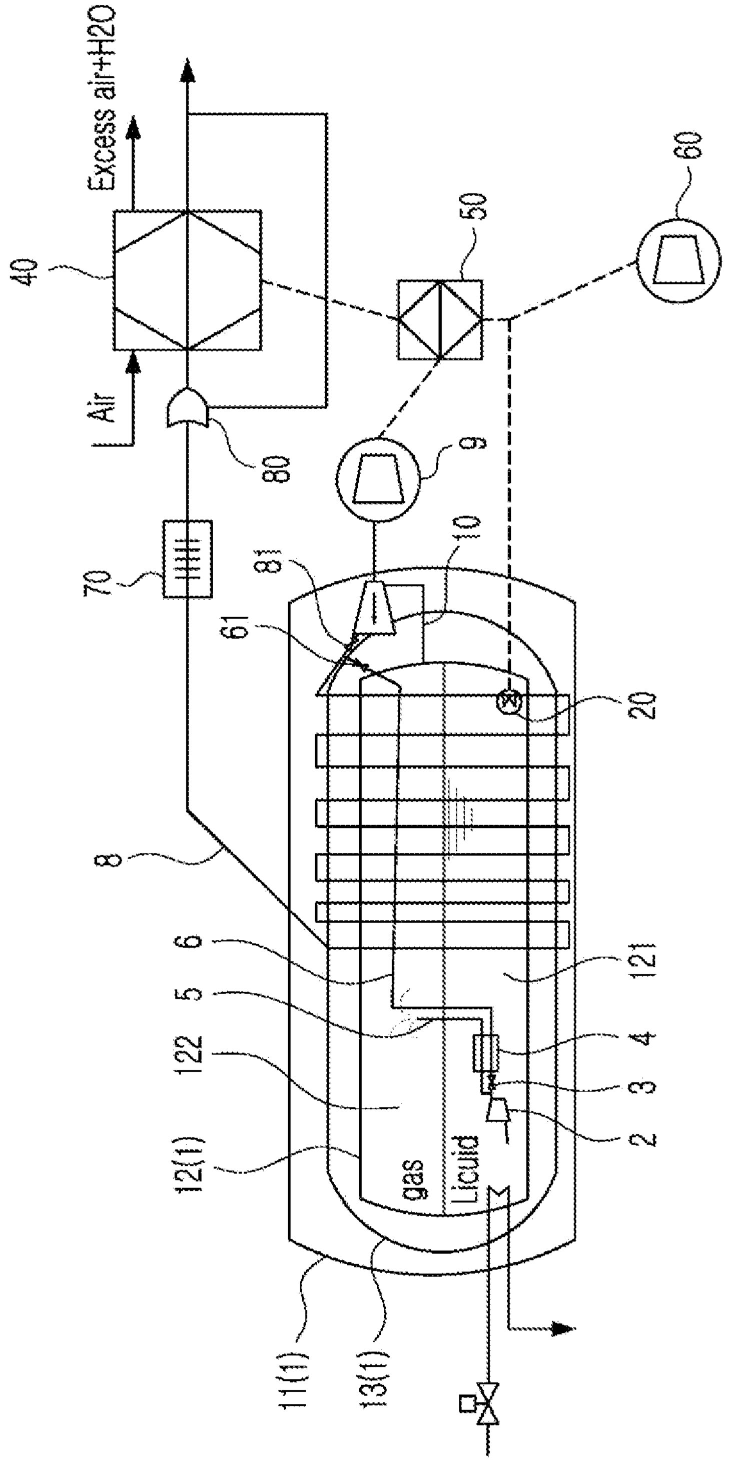
FIG. 2 is a schematic diagram showing a main configuration of a pressure regulating device for a liquid hydrogen tank for a hydrogen fuel cell vehicle, according to an embodiment of the disclosure.

FIG. 2 shows a main configuration of a pressure control device for a liquid hydrogen tank for a hydrogen fuel cell vehicle, according to an embodiment of the disclosure. Meanwhile, in describing the present embodiment, for convenience of explanation, the known configuration of the hydrogen fuel cell vehicle will not be described in detail, and the pressure control device for the liquid hydrogen tank of the disclosure will be mainly described.

As shown in FIG. 2, the pressure control device for the liquid hydrogen tank of the disclosure may be applied to a hydrogen fuel cell vehicle which may include a fuel cell 40, a battery 50, and a drive motor 60. However, aspects are not limited thereto and the device may be used in various technical fields to which the technical idea of the disclosure can be applied.

According to one known configuration, the liquid hydrogen tank 1 may include a vacuum chamber 11, an inner chamber 12 located in the vacuum chamber 11 and storing liquid hydrogen therein, and a multi-layered insulation (MLI) 13 surrounding the inner chamber 200. For reference, the multi-layered insulation used in a vacuum insulation system such as the one in this technical field may be manufactured by applying a metal with low emissivity on a polymer thin film.

The pressure control device for the liquid hydrogen tank of the disclosure may include, as the main components, a liquid hydrogen pump 2, an expansion valve 3, a heat exchanger 4, a first flow path 5, and a second flow path 6.

The liquid hydrogen pump 2 is located in a liquid hydrogen section 121 of the inner chamber 12 and performs the function of pumping liquid hydrogen.

The expansion valve 3 is located downstream of the liquid hydrogen pump 2. For reference, the meaning of "downstream" herein is based on the flow direction of the fluid. The expansion valve 3 is a valve that performs Joule-Thomson expansion, and generally, as a fluid undergoes Joule-Thomson expansion, its temperature decreases and it undergoes an isenthalpic process. In the present embodiment, the temperature of liquid hydrogen decreases due to the Joule-Thomson effect as it passes through the expansion valve 3.

The heat exchanger 4 is located downstream of the expansion valve 3. Here, the heat exchanger 4 is a known co-current flow heat exchanger, through which the first flow path 5 and the second flow path 6 pass.

The first flow path 5 allows liquid hydrogen supplied from the liquid hydrogen pump 2 to pass through the heat exchanger 4 and be sprayed into a gaseous hydrogen section 122 of the inner chamber 12.

The second flow path 6 allows liquid hydrogen supplied from the liquid hydrogen pump 2 to flow through the expansion valve 3 and the heat exchanger 4 sequentially.

In addition, the pressure control device for the liquid hydrogen tank according to the embodiment may further include a turbine 7, an auxiliary generator 9, and a third flow path 8.

The turbine 7 is a known mechanical device, which is a rotating mechanical device that extracts energy from fluid flow and converts the energy into useful work. In the present embodiment, when gaseous hydrogen higher than atmospheric pressure is used, the turbine 7 is driven to lower the temperature of the gaseous hydrogen using expansion energy, and the rotational energy of the turbine may be used as electrical energy. This will be described in detail when explaining the operation of the disclosure below.

The auxiliary generator 9 may be driven by the turbine 7 to supply electrical energy to the battery 50.

The third flow path 8 surrounds the multi-layered insulation 13 in a contact manner, and allows fluid flowing out of the turbine 7 to flow toward the fuel cell 40. The second flow path 6 may be connected to the third flow path 8 in such a way that it branches off from the third flow path 8.

Meanwhile, a first check valve 61 is located in the second flow path 6, and a second check valve 81 is located in the third flow path 8. Additionally, the second check valve 81 is located downstream of a point where the second flow path 6 branches off from the third flow path 8. As is known, the check valve is a valve that allows fluid to flow in the forward direction but automatically blocks the flow in the reverse direction.

The pressure control device for the liquid hydrogen tank according to the embodiment may further include an electric heater 20 that heats the liquid hydrogen in the inner chamber 12, and a fourth flow path 10 that guides gaseous hydrogen from the gaseous hydrogen section 122 of the inner chamber 12 to the turbine 7. For reference, the electric heater 20 may use various methods such as direct heating or conduction heating.

Hereinafter, with reference to FIGS. 2 to 5, the operation of the pressure control device for the liquid hydrogen tank for a hydrogen fuel cell vehicle according to an embodiment of the disclosure having the configuration described above will be described. Meanwhile, description of known components of the hydrogen fuel cell vehicle will be omitted or simplified so as not to obscure the gist of the disclosure.

Figure 3:
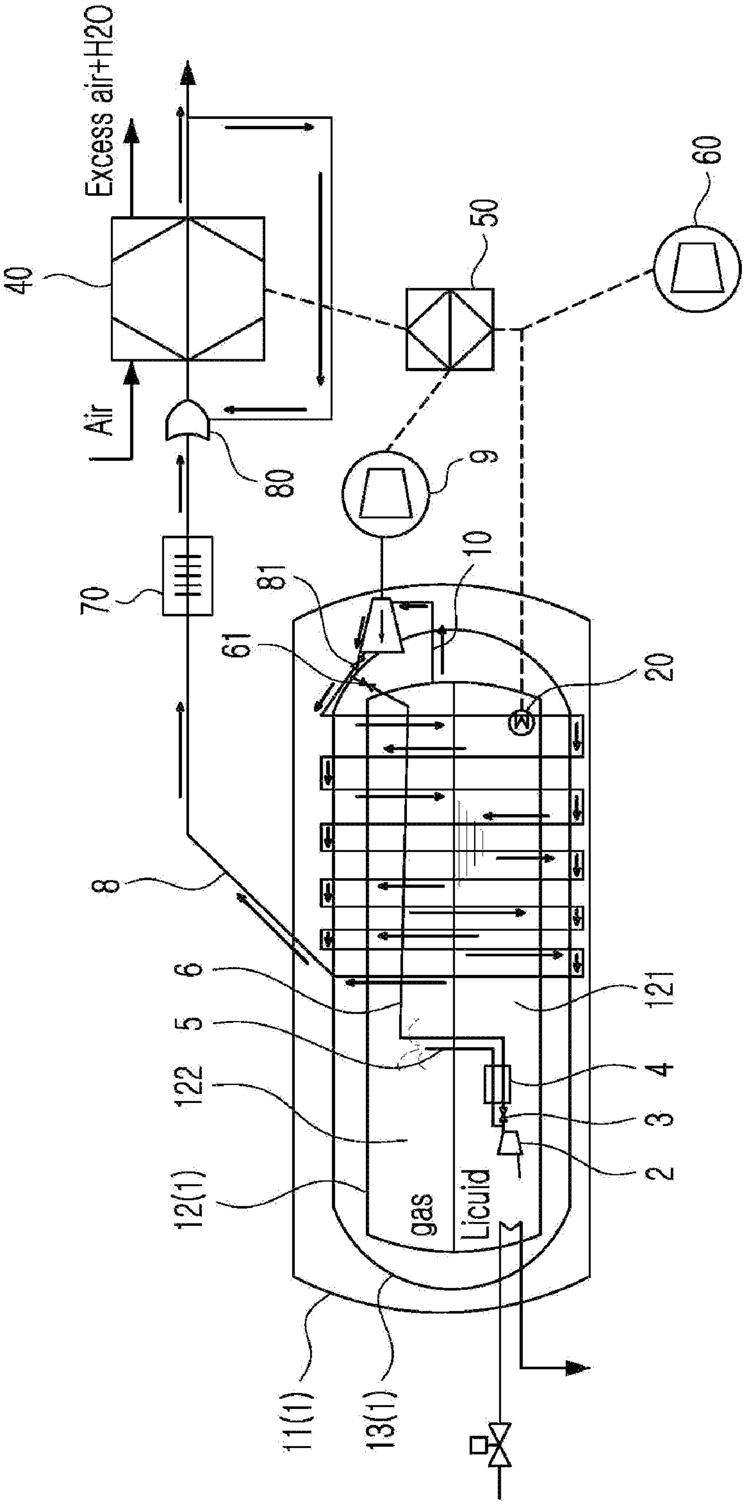
FIG. 3 is a diagram provided to explain the operation of the pressure control device of FIG. 2 when the hydrogen electric vehicle is operating.

As shown in FIG. 3, when the hydrogen fuel cell vehicle is driven, the pressure control device for the liquid hydrogen tank according to the disclosure is operated as follows.

When driving the hydrogen fuel cell vehicle, hydrogen gas in the liquid hydrogen tank 1 is used.

To this end, the electric heater 20 is operated to increase the pressure of the liquid hydrogen tank 1.

At this time, hydrogen gas enters the turbine 7 through the fourth flow path 10 and expands through the isentropic process while rotating the turbine 7. For example, if the pressure of the liquid hydrogen tank 1 is about 10 bar, the temperature of the gaseous hydrogen section 122 is about 30 to 40 K. The temperature achieved when hydrogen gas expands isentropically to the level of 1 bar is about 20K, which is similar to liquid hydrogen.

Next, the cooled gaseous hydrogen exchanges heat as it passes through the third flow path 8 surrounding the multi-layered insulation 13, raising its temperature to, for example, about 40 K, and flows toward the fuel cell 40.

As the gaseous hydrogen passes through the heat exchanger 70 of the hydrogen fuel cell vehicle, its temperature rises to about 270 K, for example, and then it passes through the ejector 80 and enters the fuel cell 40. In addition, the remaining gaseous hydrogen after being used in the fuel cell (40) goes back into the ejector 80. For reference, the ejector 80 is a known component and serves as a passive pump that draws back the remaining hydrogen after being used in the fuel cell so as to recover the same.

In addition, the rotational energy generated by the turbine 7 turns the auxiliary generator (motor) 9, through which additional power can be produced in addition to the fuel cell 40. This power is used to move the hydrogen fuel cell vehicle through the drive motor 60.

Figure 4:
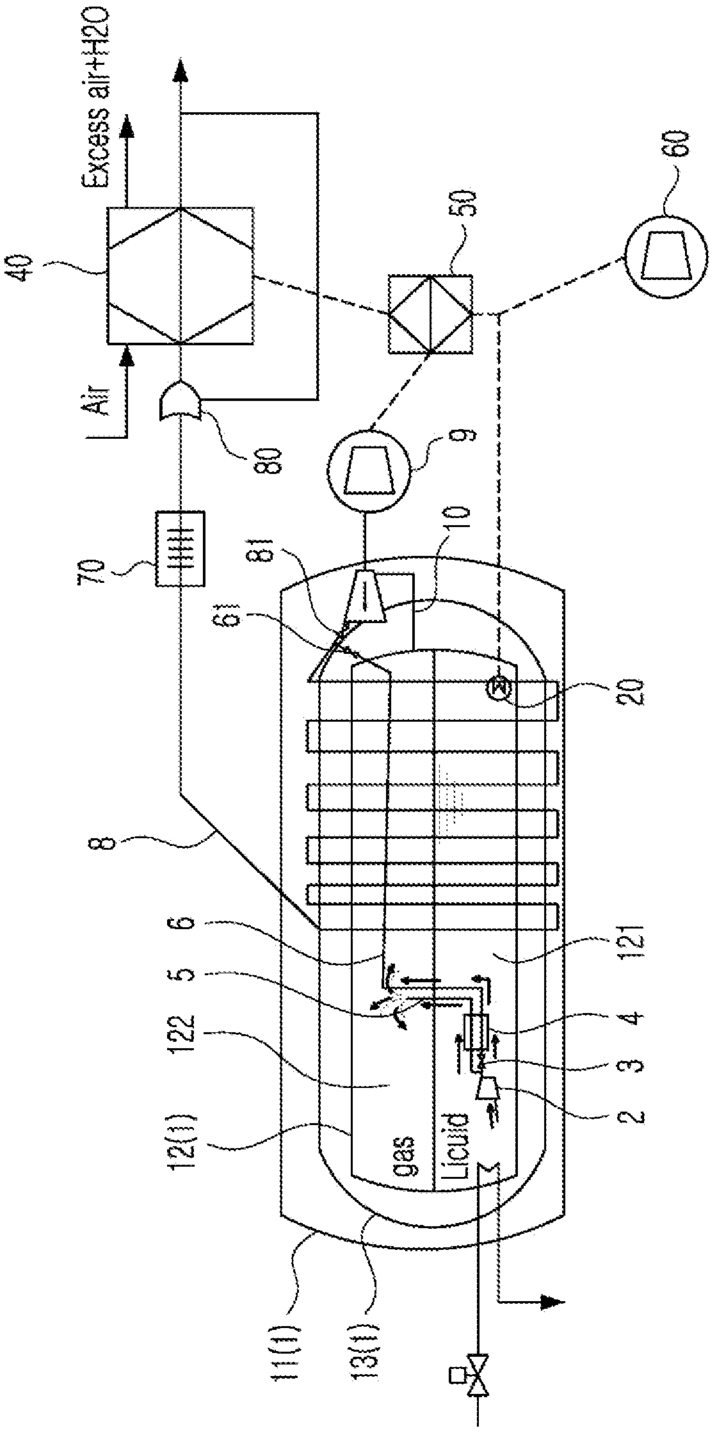
FIGS. 4 and 5 are diagrams provided to explain the operation of the pressure control device of FIG. 2 when the hydrogen electric vehicle is on standby.
Figure 5:
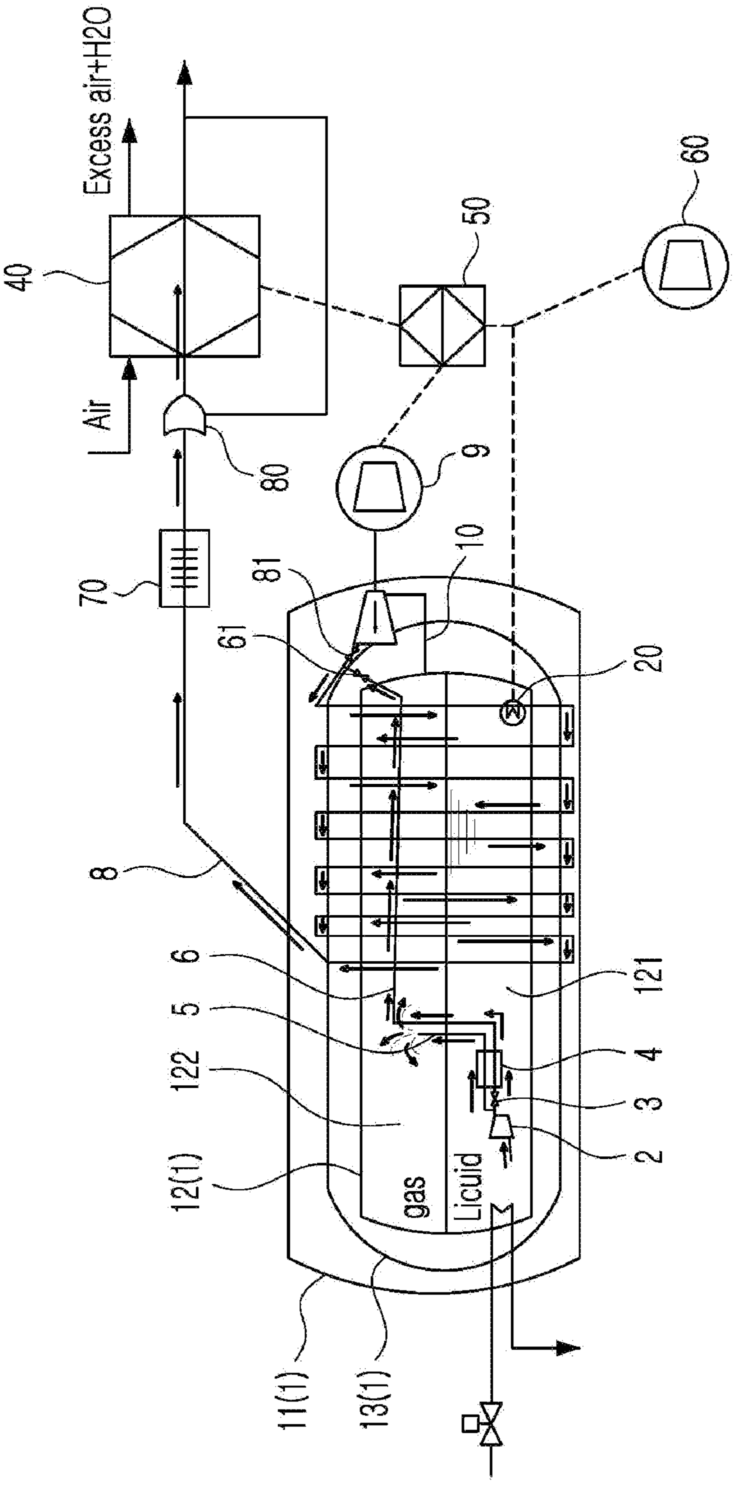

As shown in FIGS. 4 and 5, when the hydrogen fuel cell vehicle is not operating and is on standby, the pressure control device for the liquid hydrogen tank of the disclosure is operated as follows.

When the hydrogen fuel cell vehicle is not operating, both the temperature and pressure of the liquid hydrogen tank 1 increase due to external heat inflow. For example, when the tank pressure increases to about 10 bar, the temperature of the hydrogen liquid also increases to about 31 K. The pressure and temperature must be lowered since it may lead to rupture of the liquid hydrogen tank 1 if the temperature and pressure continue to rise.

For this purpose, the liquid hydrogen pump 2 is operated.

When the liquid hydrogen pump 2 is operated, for example, hydrogen liquid with a temperature of about 31 K is expanded by the Joule Thompson effect, and a temperature of about 20K is achieved through the isenthalpic process. The fluid with a temperature of about 20 K in the co-current flow heat exchanger 4 and the liquid hydrogen with a temperature of about 31 K stored in the inner chamber 12 exchange heat with each other.

Then a fluid with a temperature of about 25 K comes out from the outlet of the co-current flow heat exchanger 4, and some liquid oxygen is sprayed into the gaseous hydrogen section 122 of the inner chamber 12 through the first flow path 5, thereby lowering the temperature of the gaseous hydrogen section 122 and, as a result, decreasing the pressure.

In addition, referring to FIG. 5, liquid hydrogen is Joule-Thompson-expanded while passing through the expansion valve 3, and then the fluid with a temperature of about 25 K flowing out through the co-current flow heat exchanger 4 cools the multi-layered insulation 13 while flowing along the second flow path 6.

After being heat exchanged and cooling the multi-layered insulation 13, the liquid hydrogen flows out of the liquid hydrogen tank with an increased temperature, for example, about 50 K, and finally enters the fuel cell 40 to generate a small amount of power. The generated power is stored in the battery 50 and may be used later when necessary.

As described above, even when the hydrogen electric vehicle is on standby, the pressure control device for the liquid hydrogen tank according to the embodiment can lower the pressure of the liquid hydrogen tank where the internal pressure increases and can also generate power and store it in a battery. Meanwhile, the turbine is not used because the flow rate of gaseous hydrogen discharged from the liquid hydrogen pump 2 is small.

Although the present disclosure has been described in connection with some examples herein, the present disclosure should not be limited to those examples only, and various other changes and modifications made by those skilled in the art from the basic concept of the disclosure are also within the scope of the claims appended herein.

The invention claimed is:

1. A pressure control device for a liquid hydrogen tank for a hydrogen fuel cell vehicle comprising a fuel cell, a battery, and a drive motor, wherein the liquid hydrogen tank comprises a vacuum chamber, an inner chamber located in the vacuum chamber and storing liquid hydrogen therein, and a multi-layered insulation (MLI) surrounding the inner chamber, and the pressure control device comprises:

a liquid hydrogen pump located in a liquid hydrogen section of the inner chamber;

an expansion valve located downstream of the liquid hydrogen pump;

a heat exchanger located downstream of the expansion valve;

a first flow path through which liquid hydrogen supplied from the liquid hydrogen pump passes through the heat exchanger and is sprayed into a gaseous hydrogen section of the inner chamber;

a second flow path through which the liquid hydrogen supplied from the liquid hydrogen pump sequentially passes through the expansion valve and the heat exchanger and flows;

a turbine;

an auxiliary generator driven by the turbine to supply electrical energy to the battery; and a third flow path that contacts and surrounds the multi-layered insulation and allows fluid flowing out of the turbine to flow toward the fuel cell, wherein the second flow path is connected to the third flow path in such a way that the second flow path branches off from the third flow path.

2. The pressure control device according to claim 1, wherein the heat exchanger is a co-current flow heat exchanger through which the first flow path and the second flow path pass.

3. The pressure control device according to claim 1, wherein a first check valve is located in the second flow path, and a second check valve is located in the third flow path, and the second check valve is located downstream of a point where the second flow path branches off from the third flow path.

4. The pressure control device according to claim 1, further comprising:

an electric heater that heats the liquid hydrogen in the inner chamber; and a fourth flow path through which gaseous hydrogen is supplied to the turbine from the gaseous hydrogen section of the inner chamber.

* * * * *